July 26, 1960 J. M. HAIT 2,946,239
COMBINED POWER TRANSMISSION AND STEERING
MECHANISM FOR TRACKLAYING VEHICLES
Filed July 17, 1956 3 Sheets-Sheet 1
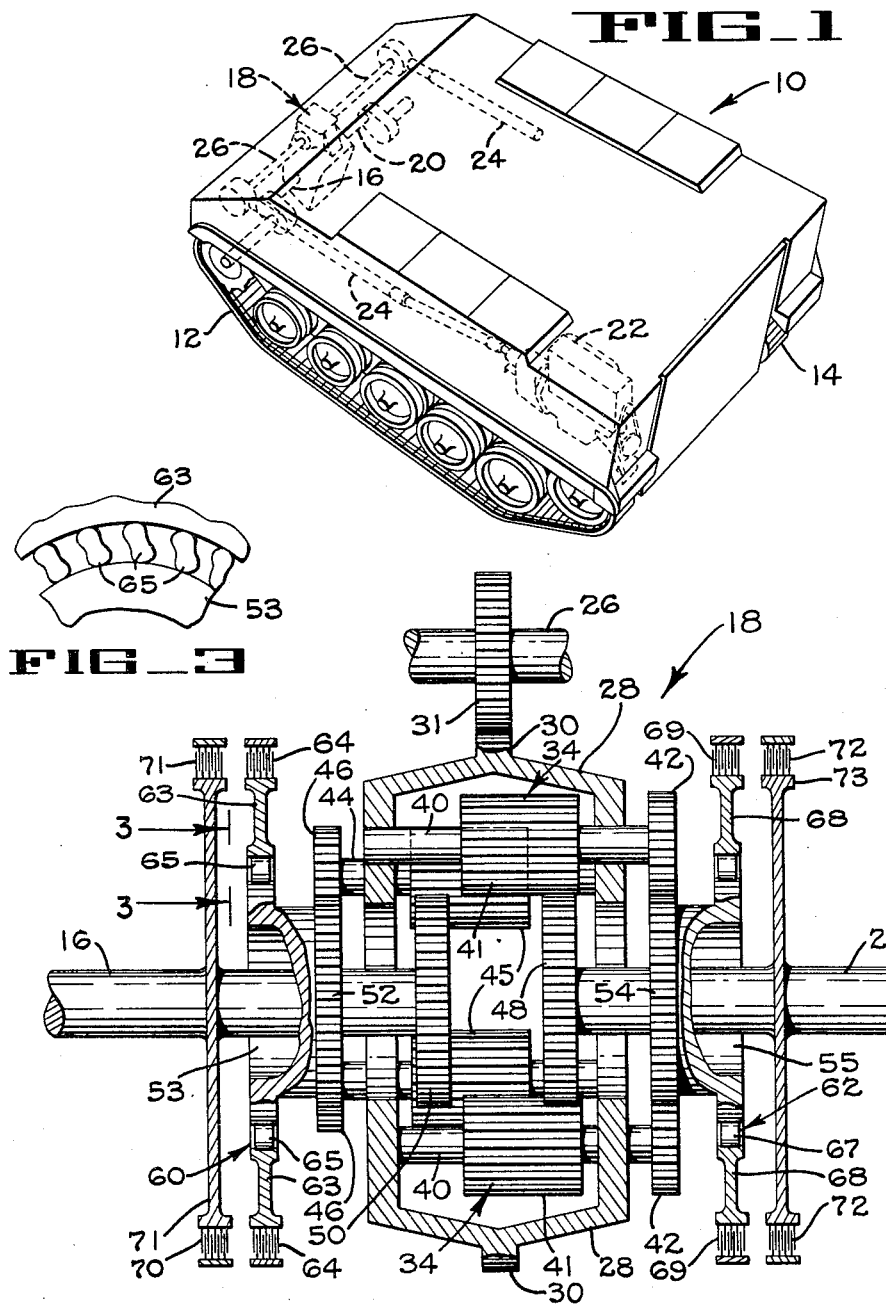
INVENTOR
JAMES M. HAIT
BY Hans G. Hoffmeister
ATTORNEY

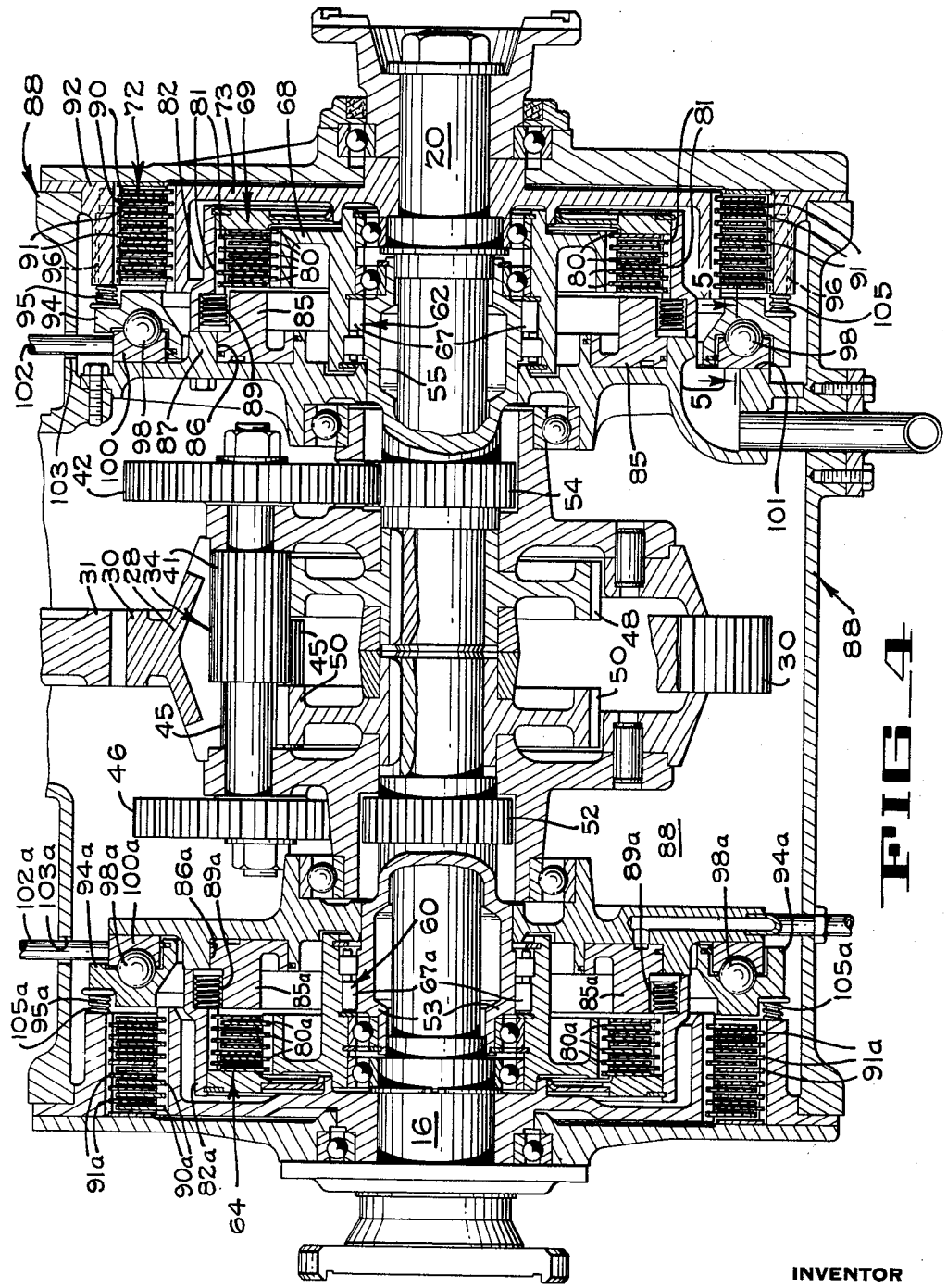

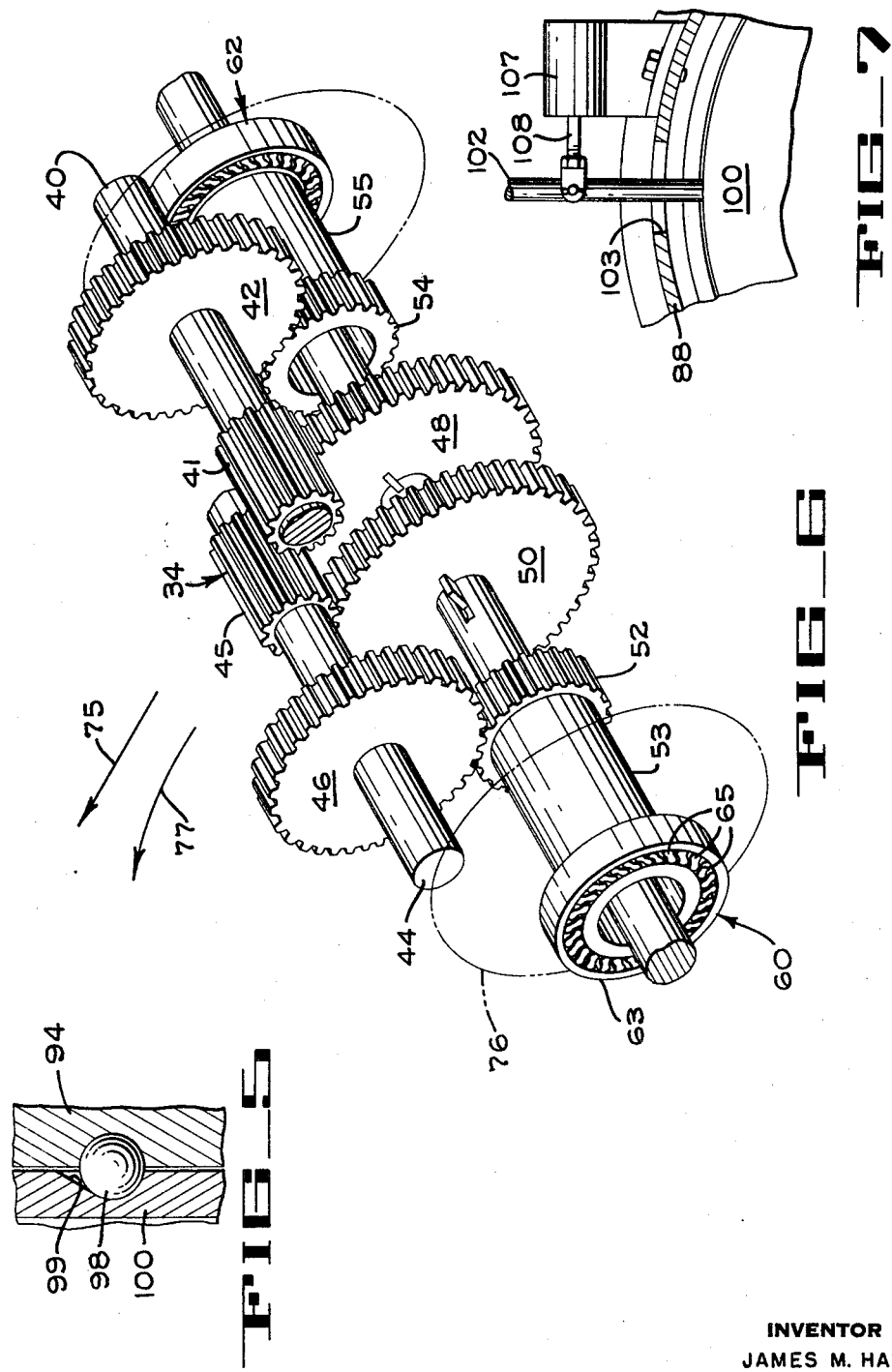

United States Patent Office 2,946,239
Patented July 26, 1960

2,946,239

COMBINED POWER TRANSMISSION AND STEERING MECHANISM FOR TRACKLAYING VEHICLES

James Merritt Hait, San Jose, Calif., assignor to Food Machinery and Chemical Corporation, San Jose, Calif., a corporation of Delaware Filed July 17, 1956, Ser. No. 598,271

17 Claims. (Cl. 74—710.5)

This invention pertains to an improved power transmission for tracklaying vehicles, and more particularly relates to an improved differential power transmission and steering mechanism for a tracklaying vehicle.

The use of a differential transmission for steering tracklaying vehicles is well known. In one arrangement, two brakes are employed to control the speed of each track. A power transfer brake is used to effect the differential or epicyclic action of the transmission causing the associated track to slow down so that the vehicle pivots on that track and executes a turn of fixed curvature. A second brake is connected to the transmission output shaft so that when this brake is applied the track will be completely stopped, causing the vehicle to execute a spot turn. Heretofore it has been impossible to have both the power transfer brake and the output shaft brake applied at the same time, and accordingly, in present installations one of the brakes must be released before the other can be applied if a change from a fixed radius turn to a spot radius turn is desired. This procedure is extremely dangerous at high speeds or when moving downhill under the control of a brake partially applied to the track at each side, since if the brake at one side is released the momentum of the vehicle will cause the track, which has been released, to speed up, causing the vehicle to turn in a direction opposite to the desired direction.

It is therefore an object of the present invention to provide a differential transmission in which both the power transfer brake and the output shaft brake may be held in applied condition at the same time.

Another object is to provide a differential transmission in which a smooth change can be made from steering by means of the power transfer brake to steering by means of the output shaft brake.

Another object is to provide a differential transmission in which the power transfer brake and the output shaft brake may be applied by the continuous actuation of a single control lever.

Another object is to provide a steering mechanism which makes possible efficient large and small radius turns.

Another object is to provide a differential transmission in which there is no overlapping or discontinuity in the action of the power transfer brake and the output shaft brake.

Other and further objects and advantages of the present invention will become apparent from the following description taken in conjunction with the accompanying drawings, in which:

Fig. 1 is a diagrammatic perspective of a vehicle provided with a transmission constructed in accordance with the teaching of the present invention.

Fig. 2 is an enlarged diagrammatic section taken centrally through the differential transmission used in the vehicle of Fig. 1.

Fig. 3 is a fragmentary elevation of a portion of the transmission of Fig. 2, taken looking in the direction of arrows 3—3 of Fig. 2.

Fig. 4 is a section taken centrally through the transmission of Fig. 1, particularly showing the braking mechanisms used in the transmission.

Fig. 5 is an enlarged fragmentary section taken on line 5—5 of Fig. 4.

Fig. 6 is a fragmentary, diagrammatic perspective of the gear train of the transmission of Fig. 4.

Fig. 7 is a diagrammatic illustration of a control linkage used with the transmission of Figure 4.

The power transmission of the present invention is particularly adapted for use in a tracklaying vehicle 10 (Fig. 1) to provide power for propelling the vehicle and means for steering the same. Such a vehicle has a track 12 on one side and a track 14 on the opposite side. The track 12 is driven from an output shaft 16 of a transmission 18, while the track 14 is driven by an output shaft 20. Power is delivered to the transmission from each engine 22 (one only being shown) through a drive shaft 24 and an input shaft 26.

In Figure 2 the differential transmission 18 is illustrated diagrammatically and comprises the input shaft 26 which drives a differential carrier 28 through gears 30 and 31. Three planetary gear set units 34 are rotatably journalled in the carrier 28, each unit comprising a shaft 40 having gears 41 and 42 keyed thereon, and a shaft 44 having gears 45 and 46 keyed thereon. The gear 41 of each planetary unit is in mesh with the gear 45 and with a sun gear 48 keyed to output shaft 20. The gear 45 of each unit is in mesh with a sun gear 50 keyed to the output shaft 16. The gear 46 is in mesh with a gear 52 formed on a sleeve 53 disposed concentrically with the output shaft 16, while the gear 42 is in mesh with a gear 54 formed on a sleeve 55.

The sleeves 53 and 55 form the drive members of one-direction or overrunning clutches 60 and 62, respectively. The driven member of clutch 60 is in the form of a ring 63 operatively connected to a brake 64. The conventional driving elements 65 of the one-direction clutch 60 are illustrated schematically in Fig. 3. Similarly, the clutch 62 comprises the drive sleeve 55, driving elements 67, and a driven ring 68 associated with a brake 69.

A brake 70 is associated with a disc-like member 71 keyed to the output shaft 16, and a brake 72 is associated with a disc-like member 73 on output shaft 20.

In accordance with well-known principles, when the input shaft 26 is driven, the planetary carrier 28 is rotated about its axis carrying the planet units 34 in a fixed circular path. If an equal resistance is applied to each output shaft, as when the vehicle tracks are resting on solid ground, the meshing gears 41 and 45 tend to rotate in opposite directions and become locked. Accordingly, the shafts 40 and 44 cannot rotate and, as a result the output shafts 16 and 20 are driven directly through the sun gears 50 and 48, respectively.

If the power transfer brake 64 is applied, the speed of the output shaft 16 is decreased and the speed of the shaft 20 is increased causing the vehicle to turn toward the left (Fig. 1) along a radius determined by the arrangement of the gears. Conversely, if the power transfer brake 69 is applied, the speed of the shaft 20 is decreased while the speed of the shaft 16 is increased causing a controlled turn to the right.

When the output shaft brake 70 is applied, the shaft 16 is completely stopped, causing the vehicle to make a spot turn to the left (Figs. 1 and 2). When the output shaft brake 72 is applied, the shaft 20 is stopped, causing the vehicle to make a spot turn to the right.

It is evident that, when the carrier 28 is being rotated, and the output shaft brake 70 is applied to stop gear 50, the planet units 34 will rotate on their own axes and tend to drive the gear 52. Accordingly, if the brake 64 were connected directly to the gear 52, it could not be applied at the same time as the brake 70 without the brakes acting in opposition to each other. However, the use of the overrunning clutch 60 permits the brake 64 to remain applied when the brake 70 is applied, since the clutch permits the gear 52 to rotate freely in one direction.

The relative rotary movement of the gears and shafts of the unit are apparent in Fig. 6 wherein the gearing is spread out slightly to avoid a confusing overlapping of elements. When the vehicle is resting on solid ground and is being driven in the direction of arrow 75, the planet carrier 28 (Fig. 2) is driven in a counterclockwise rotation as viewed from the left end of Fig. 2, carrying the interlocked planet units 34 (Fig. 6) in a circular, counterclockwise path shown by phantom line 76. The gear 52 on the one-direction clutch 60 is also driven counterclockwise. If the driver desires to make a controlled radius turn to the left, as indicated by arrow 77, the power transfer brake associated with the clutch 60 is applied to stop the rotation of the clutch 60. Accordingly, the rotation of gear 52 is stopped and each planet unit rotates counterclockwise about its own axis to decrease the speed of output shaft 16 while increasing the speed of shaft 20.

If a sharper turn toward the left is desired, the output brake 70 (Fig. 2) on the shaft 16 is applied while the power transfer brake is still applied, stopping the shaft 16 and the sun gear 50 (Fig. 6) keyed thereto. Due to the engagement of planet gear 45 with the stationary sun gear 50, an additional counterclockwise moment is applied to the gears 45 and 46. In view of the gear ratios employed, as shown in Fig. 6, this added counterclockwise moment causes clockwise rotation of gear 52, which rotation is permitted by the overrunning clutch 60. Therefore, it is apparent that, when the power transfer brake at one side of the vehicle is applied, the overrunning clutch 60 prevents rotation of the gear 52 in the direction of rotation of the planet carrier 28 (Fig. 2) to effect a controlled turn of the vehicle toward that side, but permits rotation of the gear 52 in the opposite direction to allow a spot turn to be made when the output shaft brake is applied.

Similarly, the overrunning clutch 62 (Fig. 2) on the right hand side of the vehicle cooperates with the power transfer brake 69 and the output shaft brake 72 to effect either controlled turning or spot turning of the vehicle toward the right.

It will be apparent that any radius of turn, between the radius of the controlled turn and the radius of the spot turn, can be had by only partially applying the output shaft brake while the power transfer brake is applied. In each case the overrunning clutch permits the power transfer brake to remain applied while the output shaft brake slows down the output shaft. Accordingly, under no condition will there be an interference of the action of one brake with the other or a momentary condition when neither brake is applied.

In Figure 4 a brake applying system for consecutively applying the power transfer brake and the output shaft brake at each side of the vehicle is illustrated. The transfer brakes 64 and 69 in this embodiment are substantially identical and a description of brake 69 will serve to disclose the construction and operation of brake 64 also. Brake 69 comprises a plurality of annular discs 80 splined on the driven member 68 of the one-direction clutch 62. The discs 80 cooperate with a plurality of discs 81 splined on a generally cylindrical stationary frame member 82. An annular piston 85 is slidably disposed in an annular cylinder 86 formed in a rigid transverse wall 87 of the transmission housing 88. Fluid under pressure is delivered to the cylinder 86 and drained therefrom through a conventional fluid conduit system. When pressurized fluid is delivered to the cylinder, the piston 85 moves toward the right (Fig. 4), against the predetermined resistance of a plurality of coil springs 89, and moves the discs 80 and 81 into engagement to stop rotation of the driven member 68 of the one-direction clutch 62.

The output shaft brakes 70 and 72 are substantially identical and only brake 72 will be described in detail. Brake 72 comprises a plurality of discs 90 splined on the disc-like member 73 that is keyed to the output shaft 20. The discs 90 cooperate with discs 91 splined on an annular support 92 projecting inwardly from the transmission housing 88. The discs 90 and 91 are moved into gripping engagement by means of a brake contacting ring 94 that is supported by a plurality of guide rods 95, that are slidably disposed in holes 96 in the annular support 92. The ring 94 is moved toward or away from the discs 90 and 91 by means of a plurality of balls 98 that are disposed in tapered grooves 99 (Fig. 5) in an actuating ring 100 which is rotatable in an annular recess 101 (Fig. 4) in the brake contacting ring 94. The actuating ring 100 is oscillated by the operator through a control mechanism which includes a lever 102 that is secured to the ring 100 and projects through an opening 103 in the housing 88 of the transmission. A spring 105 is disposed around each guide rod 95 between the brake-contacting ring 94 and the annular support 92 to provide a predetermined resistance to the movement of the ring 94.

When the brakes 69 and 72 are not applied, the balls 98 are disposed in the large ends of the grooves 99, and the springs 105 hold the brake-contacting ring 94 in the withdrawn position shown in Fig. 4. If it is necessary to apply the power transfer brake 69, the lever 102 is swung through a predetermined distance to actuate a valve 107 (Fig. 7) that is connected to the lever 102 by a link 108 and is operatively connected in the hydraulic control system of the cylinder 86 (Fig. 4). When actuated by the lever 102, the valve 107 directs fluid under pressure to the cylinder 86, causing the ring 85 to move the discs 80 and 81 into engagement. If it is then necessary to apply the output shaft brake 72, the lever 102 is swung further in the same direction to force the balls 98 toward the right (Fig. 4) and move the discs 90 and 91 into engagement.

As previously mentioned, the power transfer brake 64 on the left side of the transmission is identical to the brake 69, and the output shaft brake 70 is identical to brake 72. Accordingly, corresponding parts of the brake on the left side will be given identical reference numerals followed by the suffix "a."

For gradual deceleration or continuous downhill braking, the power transfer brakes 64 and 69 may be used exclusively. It is evident that if there is equal traction on each track and equal pressure is applied to both steering levers, there will be no differential action and the vehicle will be slowed down or stopped.

Both the power transfer brakes and the output shaft brakes are used for rapidly decelerating the vehicle to a sudden stop. During such a stop, the power transfer brakes provide a portion of the torque required to stop the vehicle, the output brakes providing the balance. This distribution of braking torque occurs because there is no differential action of the mechanism when equal pressure is applied to both levers, and because the power transfer brakes remain fully applied as the output brakes are applied. Consequently, both the power transfer brakes and the output brakes react directly on their respective output shafts 16 or 20 during vehicle braking.

When the vehicle is moving in a reverse direction, the clutches 60 and 62 overrun and therefore the output brakes are used for steering.

From the foregoing description it will be recognized that the present invention provides a power transmission which is particularly adapted for steering tracklaying vehicles due to the fact that both controlled differential turning and spot turning may be made. The use of an overruning clutch in connection with one of the braking elements makes possible the smooth change-over from one type of steering procedure to the other. Further, the arrangement whereby the power transfer brake and the output shaft brake can be applied consecutively by the actuation of a single lever provides a control mechanism that can be easily and efficiently manipulated by the operator.

It will be evident that modifications and variations of the embodiment of the invention disclosed herein may be made without departing from the principles of the present invention. It is to be understood, therefore, that the scope of the invention should be limited only by the scope and proper interpretation of the claims appended hereto.

Having thus described the invention, what I claim to be new and desire to protect by Letters Patent is:

1. In a power transmission of the type having a power driven controlled differential, an output shaft driven by said differential, a brake on said output shaft, and a power transfer brake associated with the differential for controlling the speed of the output shaft, and means for applying each of said brakes, the improvement which comprises a one-direction clutch operatively connected between said power transfer brake and said differential and arranged to permit both of said brakes to remain in applied position at the same time during operation of said differential.

2. In a power transmission of the type having a controlled differential, a pair of output shafts driven by said differential, a brake connected to each output shaft, and a pair of power transfer brakes associated with said differential and arranged upon being actuated to control the speed ratio of said output shafts, the improvement which comprises a one-direction clutch operatively connected between each power transfer brake and said differential.

3. A power transmission comprising a power input and a pair of power output shafts, a controlled differential associated with said shafts, a pair of one-direction power transmission clutches, each clutch being associated with one of said output shafts through said differential, a power transfer brake associated with each of said clutches, and a separate brake directly connected to each output shaft whereby application of either power transfer brake effects a decrease in the speed of the associated output shaft and an increase in the speed of the other output shaft, and application of either output shaft brake while the associated power transfer brake is applied slows down the output shaft.

4. A power transmission comprising a power input and a pair of power output shafts, a differential operatively disposed intermediate said shafts, a pair of one direction power transmission clutches, each clutch being associated with one of said output shafts through said differential, a power transfer brake associated with each of said clutches, a separate brake directly connected to each output shaft, and a control lever operatively connected to the power transfer brake and the output brake associated with each output shaft, each control lever being movable successively through a first range to apply one of said brakes and a second range to apply the other brake.

5. A power transmission comprising a controlled differential having an output shaft, a one-direction clutch connected to said differential, a first brake operatively associated with said clutch and arranged when applied to stop rotation of a portion of said clutch to effect epicyclic action of said differential, and a second brake connected to said output shaft, said one-direction clutch being arranged to permit rotation of the portion of said clutch connected to said differential when both of said brakes are applied.

6. A power transmission comprising a controlled differential having an output shaft, a one-direction clutch having a drive member connected to said differential, a power transfer brake operatively connected to the driven member of said clutch a brake associated with said output shaft, and power input means for said differential, said power transfer brake being effective to stop rotation of said clutch drive member to cause a differential action of the transmission when said output shaft is not applied, and said clutch being arranged to permit rotation of said drive member when both of said brakes are applied.

7. A power transmission comprising a rotatable power input member mounted for rotation about a fixed axis, an output shaft rotatable on said axis, a gear train interconnecting said input member and said shaft, a brake operatively connected to said shaft and arranged upon application thereof to stop rotation of said shaft, means for rotating said power input member, a control gear in mesh with a member of said gear train, and an overrunning clutch operatively connected to said control gear and arranged to permit rotation of said control gear in one direction when said brake is applied during rotation of said power input member but to prevent rotation in the opposite direction.

8. A power transmission comprising a power input member mounted for rotation about a fixed axis, an output shaft rotatable on said axis, a gear train interconnecting said input member and said shaft, a first braking means associated with said shaft and arranged upon application to stop rotation of said shaft, means for rotating said input member, a control gear in mesh with a member of said gear train, an overrunning clutch having a rotatable drive member secured to said control gear and a rotatable driven member operatively connected to said drive member, and a second braking means connected to said driven member and arranged upon application to stop rotation of said driven member, said overrunning clutch being arranged to permit rotation of said drive member in one direction when said second braking means is applied during rotation of said input member.

9. A power transmission comprising a power input member mounted for rotation about a fixed axis, an output shaft rotatable on said axis, a first sun gear keyed to said shaft, a second sun gear mounted for rotation coaxially of said shaft, a planetary gear set rotatable as a unit with said input member and disposed in mesh with said first and second sun gears, means for rotating said power input member to move said planetary gear set as a unit in a circular path around the axis of said shaft, whereby said gear set drives said sun gears in a predetermined direction of rotation, an overrunniing clutch connected to said second sun gear, and a brake operatively connected to said shaft, said clutch being arranged when engaged to prevent rotation of said second sun gear in said predetermined direction when said brake is applied during rotation of said power input member and to permit rotation of said second sun gear in an opposite direction.

10. A power transmission comprising a carrier mounted for rotation about a fixed axis, means for rotating said carrier in a predetermined direction for rotation, an output shaft rotatable on said axis, a first brake associated with said shaft to stop rotation of said shaft upon being applied, a planetary gear train interconnecting said shaft and said carrier, a sun gear in mesh with a planet gear of said planetary gear train, a power transfer brake, and an overruning clutch operatively connected between said sun gear and said power transfer brake, said clutch being so arranged as to prevent rotation of said sun gear in said predetermined direction when both said brakes are applied during rotation of said carrier in said predetermined direction but to permit rotation of said sun gear in an opposite direction.

11. A power transmission comprising a carrier mounted for rotation about a fixed axis, a pair of output shafts rotatably mounted on said axis, a planetary gear train in said carrier and connected in driving relation with said output shafts and including a sun gear disposed coaxially of one of said shafts, means for rotating said carrier in a predetermined direction, a one direction clutch connected to said sun gear, a brake operatively connected to said clutch, said clutch being arranged to prevent rotation of said sun gear in said predetermined direction when said carrier is rotated and said brake is applied but permitting rotation of said sun gear in an opposite direction, and means for stopping the rotation of said one shaft while said carrier is rotated and said brake is applied, to thereby drive the other shaft in said predetermined direction of rotation through said planetary gear train and to drive said sun gear in the opposite direction of rotation.

12. A power transmission comprising a carrier mounted for rotation about a fixed axis, means for rotating said carrier in a predetermined direction of rotation, an output shaft rotatable on said axis, a first sun gear keyed to said shaft, a second sun gear mounted for rotation about said axis, a planetary gear set journalled for rotation in said carrier at a point spaced from said axis, said gear set being movable as a unit in a circular path around said axis when said carrier is rotated and being in mesh with said first and second sun gears, means for preventing rotation of said planetary gear set on its own axis during said circular movement whereby said gear set moves said sun gears in said predetermined direction of rotation, an over-running clutch connected to said second sun gear, a first brake operatively connected to said clutch, said clutch being arranged to prevent rotation of said second sun gear in said predetermined direction when said first brake is applied during rotation of said carrier but permitting rotation of said second sun gear in the opposite direction of rotation, and a second brake operatively connected to said output shaft to stop rotation of said shaft and drive said second sun gear in said opposite direction through said first sun gear and said planetary gear set when said first brake is applied during rotation of said carrier.

13. A power transmission comprising a carrier mounted for rotation about a fixed axis, a first and a second output shaft mounted for rotation on said axis, first braking means associated with one of said shafts to stop rotation of said one shaft upon being applied, a planetary gear train interconnecting said carrier with each of said output shafts and having a plurality of planet gears, means for rotating said carrier to drive said shafts in a predetermined direction of rotation, a sun gear mounted for rotation about said axis and disposed in meshing engagement with one of said planet gears, a second braking means, and an overrunning clutch operatively connected between said second braking means and said sun gear, said clutch being arranged to stop rotation of said sun gear when said second braking means is applied causing each of said planet gears to rotate on its own axis to rotate said one shaft in said predetermined direction at a reduced speed and to rotate the other shaft in said predetermined direction at an increased speed, said clutch further being arranged to permit said sun gear to rotate in a direction opposite to said predetermined direction when both of said braking means are applied during rotation of said carrier.

14. A power transmission comprising a power input member mounted for rotation about a fixed axis, first and second axially aligned output shafts mounted for rotation about said fixed axis, a first sun gear keyed to said first shaft, a second sun gear mounted for rotation coaxially of said first shaft, a first planetary gear set in mesh with said sun gears, means for rotating said power input member to move said planetary gear set in a circular path in a predetermined direction of rotation around said first shaft, a planetary gear set operatively connected between said first planetary gear set and said second output shaft and arranged to prevent rotation of said gear set during said circular movement whereby said first gear set drives said sun gears in said predetermined direction of rotation during said circular movement, an over-running clutch connected to said second sun gear, a first brake operatively connected to said second sun gear, said clutch being arranged to prevent rotation of said second sun gear in said predetermined direction when said first brake is applied during rotation of said input member but permitting rotation of said second sun gear in the opposite direction, a second brake operatively connected to said first drive shaft to stop rotation of said first shaft and drive said second sun gear in said opposite direction of rotation when said first brake is applied and to drive said second shaft in said predetermined direction of rotation through said planetary gear sets.

15. A power transmission comprising a carrier mounted for rotation about a fixed axis, a pair of aligned output shafts journalled for rotation on said axis, a first sun gear keyed to each of said shafts, a pair of planetary gear sets rotatably journalled in said carrier, each gear set being in mesh with the other gear set and with one of said first sun gears, a second sun gear rotatably mounted coaxially of one of said output shafts and disposed in mesh with one of said planetary gear sets, means for rotating said carrier in a predetermined direction of rotation to move said planetary gear sets in a circular path about said axis to drive said shafts and said second sun gear in said predetermined direction of rotation, an overrunning clutch connected to said second sun gear, a first brake operatively connected to said clutch, a second brake connected to said one output shaft, means for applying said first brake to stop said second sun gear while said carrier is being rotated whereby to rotate said planetary gear sets about their axes and urge said one shaft in a direction opposite to said predetermined direction and to urge said other shaft in said predetermined direction, and means for applying said second brake while said first brake is applied to stop rotation of said one output shaft and to rotate said second sun gear in said opposite direction and to rotate said other shaft in said predetermined direction at an increased speed of rotation.

16. A power transmission comprising a carrier mounted for rotation about a fixed axis, means for rotating said carrier in a predetermined direction of rotation, a first output shaft mounted for rotation on said fixed axis and projecting from one side of said carrier, a second output shaft coaxial with said first output shaft and projecting from the opposite side of said carrier, a brake connected to each output shaft and arranged to stop rotation of the shaft upon being actuated, a first sun gear keyed to each output shaft inside said carrier, a second sun gear mounted for rotation about each shaft inside said carrier, a plurality of pairs of meshing planetary gear sets journalled in said carrier, one set of each pair being in mesh with the sun gears associated with said first output shaft and one set of each pair being in mesh with the sun gears associated with said second output shaft, an overrunning clutch operatively connected to each of said second sun gears, and a separate brake connected to each clutch and to each output shaft, each overrunning clutch being arranged to prevent rotation of the associated sun gear in said predetermined direction of rotation when the associated brakes are applied during rotation of said carrier while permitting rotation of the associated sun gear in the opposite direction.

17. In a power transmission, a power input and a power output shaft, a differential operatively disposed intermediate said shafts, a one direction power transmission clutch associated with said differential, a power transfer brake connected to said clutch, an output brake connected to said output shaft, a spring-loaded brake-engaging member arranged when actuated to apply said output brake, hydraulically actuated means for applying said power transfer brake, a control member arranged upon being actuated to direct fluid under pressure to said brake-applying means, a lever operatively connected to the brake engaging member of said output brake and to said control member, and means mounting said lever for movement through a first range of movement to actuate said control member to apply said power transfer brake and through a second range of movement to actuate said brake-engaging member to apply said output brake.

References Cited in the file of this patent

UNITED STATES PATENTS

| | | |
|---|---|---|
| 2,468,628 | Henning | Apr. 26, 1949 |
| 2,580,381 | Banker | Jan. 1, 1952 |
| 2,645,137 | Roche | July 14, 1953 |
| 2,757,513 | Banker | Aug. 7, 1956 |

OTHER REFERENCES

S.A.E. Journal, vol. 60, pp. 33, 34, 35, September 1952.